3,036,123
SEPARATION OF PHTHALIC ACIDS
Paul R. Hines, Anaheim, and Richard P. Taylor, Corona Del Mar, Calif., assignors to Richfield Oil Corporation, Los Angeles, Calif., a corporation of Delaware
No Drawing. Filed Dec. 24, 1957, Ser. No. 704,898
3 Claims. (Cl. 260—525)

The present invention relates to a method of separating and recovering isophthalic acid and terephthalic acid from their mixtures. More particularly, the present invention is concerned with the recovery of these acids in substantially pure form by use of their mutual solubilities in an aqueous medium within given temperature ranges.

Phthalic acids have become chemicals of substantial economic value. Terephthalic acid is particularly useful in preparing synthetic resin fibers employed in the manufacture of various cloths and articles of apparel such as shirts, socks, dresses, and great numbers of other useful articles of commerce. Methods of preparing the phthalic acids include the liquid phase nitric acid oxidation of xylenes or toluic acids derived by air oxidation of the xylenes. The xylenes are produced from petroleum sources, usually as mixtures of the ortho, meta and para isomers. When mixtures of xylene or toluic acid isomers are oxidized the phthalic acids are produced in isomeric mixtures.

Orthoxylene can be separated from its meta and para isomers by distillation and the resulting mixture of the latter isomers is then oxidized to a mixture of isophthalic and terephthalic acids either by nitric acid oxidation or by air oxidation to the corresponding mixture of toluic acids which is then oxidized to phthalic acids by nitric acid. Thus, in these methods, mixtures of isophthalic and terephthalic acids are produced from which the terephthalic acid must be separated substantially free of isophthalic acid. There have been methods proposed for separating the mixtures of isophthalic and terephthalic acids by solvent recrystallization or solvent extraction procedures.

The separation of these acids can be effected by solvent procedures utilizing water as the separating medium under such conditions that the water selectivity dissolves the isophthalic acid rendering the substantially insoluble terephthalic acid recoverable as by filtration. In these aqueous solvent recovery procedures the terephthalic acid is recovered by heating a water-acids mixture to a temperature of about 140 to 200° C. and filtering the solid terephthalic acid therefrom. The isophthalic acid can be recovered by cooling the filtrate to the crystallization point of the isophthalic acid. Such a procedure is effective to recover the substantially pure terephthalic acid from the mixture but, the isophthalic acid recovered will not be substantially pure due to the fact that some of the terephthalic acid will be solubilized within these temperature ranges and thus will be recrystallized with the isophthalic acid.

By the present invention we have devised a process wherein both terephthalic acid and isophthalic acid can be recovered in substantialy pure form from their mixtures. More particularly, the present invention is predicated upon the fact that the mutual solubility of isophthalic acid when in admixture with terephthalic acid is very similar to its separate solubility at all temperatures, whereas the mutual solubility of terephthalic acid increases considerably in comparison to its separate solubility at temperatures above about 150° C. This increased mutual solubility of the terephthalic acid isomer at the higher temperature gives a much decreased ratio of mutual solubility when compared with the solubility ratios of the iso to terephthalic acid at temperatures below about 150° C. This effect of increased terephthalic acid solubility called the mutual solubility effect, exists at temperatures up to about 250° C. and cannot be predicted from the separate solubilities of the two materials.

We have found that by operating within given conditions the terephthalic acid can be separated in substantially pure form from its mixtures with isophthalic acid, and thereafter the isophthalic acid can also be separated and recovered in substantially pure form. For instance, we have found that at temperatures in the range of about 100 to 170° C., preferably about 140 to 160° C., the isophthalic acid will be solubilized in the aqueous medium whereas the terephthalic acid will be substantially insoluble and can be recovered as by filtration. Although the use of the water as the solvent is selective within these temperature ranges a small fraction of the terephthalic acid will be solubilized and it is this amount which normally renders any isophthalic acid recovered impure. However, if the concentration of the acids in the aqueous filtrate is varied and the temperature of the filtrate raised to from about 150° to 250° C., then the terephthalic acid can be completely solubilized in the aqueous medium and the isophthalic acid, a substantial portion of which is insoluble under these conditions, can be recovered as by filtration.

The data in regard to the solubility of the acids was obtained as follows: A one-gallon autoclave equipped with a pressure filter and sampling system was charged with sufficient amounts of isophthalic and terephthalic acids and water to provide a saturated solution as to the given acids at the temperatures indicated. The samples were obtained by pressurizing the saturated solution through the filter into a pressure receiver for separation from the excess acids. The filtrate sample was cooled to crystallize the acids, filtered and the separated solids dried. The isomeric ratios in the dried solids was determined by infrared analysis. The data obtained as a result of these studies are set forth in the tables below. Table I shows the separate solubility of the two acids in water at the indicated temperature and Table II shows their mutual solubilities in aqueous solution.

Table I

| Temp., °C. | Separate Solubility [1] | | Separate I/T Ratio |
|---|---|---|---|
| | Percent Iso- | Percent Tere- | |
| 140 | 1.35 | 0.110 | 12 |
| 150 | 2.33 | 0.170 | 14 |
| 160 | 4.00 | 0.265 | 15 |
| 170 | 6.80 | 0.405 | 17 |
| 190 | 19.50 | 0.96 | 20 |
| 200 | 33.00 | 1.50 | 22 |

[1] The solubilities are reported on the basis of grams of acid per 100 grams of water.

Table II

| Temp., °C. | Mutual Solubility [1] | | Mutual I/T Ratio |
|---|---|---|---|
| | Percent Iso- | Percent Tere- | |
| 140 | 1.3 | 0.086 | 15 |
| 150 | 2.3 | 0.17 | 13.5 |
| 160 | 4.0 | 0.44 | 9.1 |
| 170 | 6.5 | 1.06 | 6.1 |
| 190 | 19.0 | 6.30 | 3.0 |
| 200 | 32.0 | 10.40 | 3.1 |
| 217 | 42.0 | 9.00 | 4.7 |
| 227 | 39.0 | 12.00 | 3.2 |
| 230 | 63.0 | 12.00 | 5.2 |
| 232 | 48.0 | 15.00 | 3.2 |

[1] The solubilities are reported on the basis of grams of acid per 100 grams of water.

The above data show that at suitable concentrations pure terephthalic acid can be obtained from the aqueous mixtures at temperatures of about 170° C. or below with only slight loss of the terephthalic acid to the solution. The isophthalic acid is solubilized and after removal of water pure isophthalic acid can be recovered from the mother liquor at a temperature of about 150° C. or above, the terephthalic acid having been solubilized.

In effecting the present process, the isophthalic and terephthalic acids can be placed in water to give the desired aqueous mixture. The liquid phase nitric acid oxidation of mixtures of meta- and para-xylenes or the corresponding toluic acids gives aqueous mixtures of iso- and tere-phthalic acids which can be employed in our process as the aqueous mixture if desired. This method of operation avoids the separation of the phthalic acids from their reaction mixture and the redissolving of the acids in a separate aqueous medium. Regardless of the manner in which the initial aqueous mixture is obtained, it should have sufficient water provided to afford a saturated or near saturated solution with respect to the isophthalic acid at the temperature in the range of about 100 to 170° C. employed in the first stage of our process. The mixture should contain substantially more terephthalic acid than is soluble at the first stage temperature. However, there should be no more isophthalic acid present than is soluble at this temperature, otherwise the undissolved terephthalic acid will be contaminated. Excess water in the first stage operation results in a loss in recovery of terephthalic acid. In the first stage the aqueous mixture is heated to a temperature of about 100 to 170° C. where substantially the entire amount of isophthalic acid will be solubilized, and the relatively insoluble terephthalic acid is separated by any convenient means such as by filtration. The filter cake will contain relatively pure terephthalic acid and the filtrate will include the isophthalic acid and the small percentage of terephthalic acid which is solubilized under these conditions.

In order to recover substantially pure isophthalic acid from this mixed acid solution in accordance with the present invention, we remove water from the above filtrate as by evaporation until an aqueous solution is provided which is saturated or near saturated with respect to the terephthalic acid at the temperature of the second separation, which is in the range of about 150 to 250° C. This aqueous medium will contain substantially more isophthalic acid than is soluble at the operating temperature within the range of from about 150 to 250° C. where substantially all the terephthalic acid will be in solution and the isophthalic acid remaining undissolved can be recovered as by filtration. The filtrate will contain small amounts of mixed acids and can be recycled back to the first-stage process for recovering additional terephthalic acid. Although the temperature ranges for the terephthalic acid and isophthalic acid recovery stages overlap to some extent, it is to be understood that the temperature for the isophthalic acid recovery stage must at least exceed that for the terephthalic recovery stage and preferably the temperature difference should be at least about 10° C. or more. Also, in dewatering the filtrate from the terephthalic acid recovery stage, we generally remove at least about 50 percent, preferably at least about 75 percent, of the water. All of the water may be removed and then added back, but this is an unnecessary procedure.

As an example of the present process, 100 grams of mixed acids corresponding to a ratio of 70/30 isophthalic to terephthalic acids can be charged into sufficient water, e.g. 3040 milliliters, to yield a solution saturated with respect to the isophthalic acid at 150° C. At this temperature as shown by the table, 0.17 percent of terephthalic acid, based on the water, will also be in solution. If the aqueous solution is filtered at this temperature, 24.9 grams (83%) of the terephthalic acid can be collected as a filter cake and the filtrate will contain 70 grams of isophthalic acid plus the 5.1 grams of terephthalic acid dissolved at the operating temperature. The ratio of acids in the filtrate will correspond to a 13.7 to 1 isophthalic acid to terephthalic acid ratio. To recover pure isophthalic acid from the above filtrate the temperature must be raised into the area where is obtained the decreased mutual solubility ratio and water must be removed to give an aqueous solution preferably substantially saturated with respect to the terephthalic acid at that temperature. The use of temperatures substantially higher than that where the solution is saturated with respect to terephthalic acid results in loss of isophthalic acid to the solution. Thus, if 2940 milliliters of water are evaporated from the filtrate and the 75.1 grams of the above-mixed acids in the remaining 100 milliliters of water are charged into the isophthalic acid recovery stage, a temperature of about 185° C. must be maintained to yield an aqueous solution saturated with respect to the terephthalic acid. Under these conditions, about 16 grams of the isophthalic acid will also be in solution leaving a solid residue of about 54 grams of the isophthalic acid (77%) recoverable as by filtration. The filtrate or mother liquor will contain about 5 grams of terephthalic acid plus about 16 grams of isophthalic acid which corresponds to about a 75/25 isophthalic to terephthalic acid ratio and is suitable for recycling back to the terephthalic acid recovery stage.

As noted, when treating a given acid mixture in accordance with this invention the temperature of the aqueous mixture in the first stage or the terephthalic acid recovery stage is within the range of about 100 to 170° C., preferably about 140 to 160° C., to provide the desired degree of selectivity and dissolution, and the temperature of the solution in the second stage is within the range of about 150 to 250° C. to provide the desired degree of selectivity and dissolution with the temperature in the second stage exceeding at least by about 10° C. that employed in the first stage. Additionally the temperature must be high enough to dissolve substantially all of the isophthalic acid in the first stage and substantially all of the terephthalic acid in the second stage and at the same time, in order to provide the maximum amount of acid recoveries in each stage, the temperature should not be materially above the point at which all of the isophthalic acid or the terephthalic acid dissolves in the respective stages. Thus, if maximum acid recovery is to be effected in each of the stages the temperature of the aqueous medium during filtration at each stage will approximate the lowest point at which substantially all of the isophthalic acid or the terephthalic acid is dissolved in the respective stages. Also, before appreciable recovery of either of the acids is effected they must be present in the aqueous mixture in an amount substantially greater than that which is soluble in the aqueous medium at the temperature necessary to effect the separation. Thus in the terephthalic acid recovery stage it is preferred that more terephthalic acid be present in the mixture than corresponds to an isophthalic acid to terephthalic acid ratio of about 90/10 and in the isophthalic acid recovery stage it is preferred that there be present more isophthalic acid than corresponds to an isophthalic acid to terephthalic acid ratio of about 80/20.

In some instances a phthalic acid mixture may be originally obtained which will contain more isophthalic acid than corresponds to an iso to terephthalic acid ratio of about 80/20 in which case the isophthalic acid could be recovered first by the second stage of our process with terephthalic acid being recovered as by treating the remaining material at the conditions of the first stage of our recovery process. Thus mixtures of the acids corresponding to ratios of iso to terephthalic acid of between about 80/20 and 90/10 can be first processed by either of the two stages depending upon which isomer is to be initially recovered in pure form.

We claim:
1. A method of recovering isophthalic acid and terephthalic acid from a mixture consisting essentially of isophthalic and terephthalic acids which comprises providing a first mixture of said acids in an aqueous medium containing sufficient water to dissolve substantially all of the isophthalic acid at a temperature in the range of about 100 to 170° C., said aqueous mixture containing substantially more terephthalic acid than corresponds to a ratio of isophthalic to terephthalic acid of 90:10, separating at said temperature a solids fraction and a liquid fraction, removing at least about 50% of the water from said liquid fraction so that the fraction contains substantially all of its terephthalic acid in solution at a temperature in the range of about 150 to 250° C. and at least about 10° C. higher than employed in the previous separation of terephthalic acid, separating a solids fraction and a liquid fraction from said dewatered fraction at a temperature of about 150 to 250° C. and at least about 10° C. higher than employed in the previous separation of terephthalic acid, said dewatered fraction containing substantially more isophthalic acid than corresponds to a ratio of isophthalic to terephthalic acid of about 80:20.

2. The method of claim 1 in which the separation of the terephthalic acid is at a temperature of about 140 to 160° C.

3. A method of recovering isophthalic acid and terephthalic acid from a mixture consisting essentially of isophthalic and terephthalic acids which comprises providing a first mixture of said acids in an aqueous medium substantially saturated with respect to isophthalic acid at a temperature in the range of about 140 to 160° C., said aqueous mixture containing substantially more terephthalic acid than corresponds to a ratio of isophthalic to terephthalic acid of about 90:10, separating at said temperature a solids fraction and a liquid fraction, removing at least about 50% of the water from said liquid fraction so that it is substantially saturated with respect to terephthalic acid at a temperature in the range of about 150 to 250° C. and at least about 10° C. higher than employed in the previous separation of terephthalic acid, separating a solids fraction and a liquid fraction from said dewatered fraction at a temperature of about 150 to 250° C. and at least about 10° C. higher than employed in the previous separation of terephthalic acid, said dewatered fraction containing substantially more isophthalic acid than corresponds to a ratio of isophthalic to terephthalic acid of about 80:20.

References Cited in the file of this patent
UNITED STATES PATENTS
2,820,819     Aroyan  ---------------- Jan. 21, 1958